United States Patent [19]

Dobersch

[11] 4,273,463

[45] Jun. 16, 1981

[54] STEEL TUBE SCAFFOLD

[76] Inventor: Gerhard Dobersch, No. 10, Adolf-Kaschny-Strasse, 5090 Leverkusen, Fed. Rep. of Germany

[21] Appl. No.: 81,510

[22] Filed: Oct. 3, 1979

[51] Int. Cl.³ .................................................. E04G 7/00

[52] U.S. Cl. .................................... 403/246; 182/179; 211/182; 403/49

[58] Field of Search ................. 403/49, 246, 245, 230, 403/189, 190, 256; 182/179; 211/182

[56] References Cited

U.S. PATENT DOCUMENTS

| | | | |
|---|---|---|---|
| 3,179,212 | 4/1965 | Gostling | 403/49 X |
| 3,817,641 | 6/1974 | Steele et al. | 403/256 |
| 3,879,143 | 4/1975 | Gostling | 403/256 X |
| 3,880,533 | 4/1975 | Gostling | 403/189 |
| 4,039,264 | 8/1977 | Sharp | 403/246 |
| 4,044,523 | 8/1977 | Layher | 403/49 X |
| 4,180,342 | 12/1979 | Layher | 403/49 X |

FOREIGN PATENT DOCUMENTS

| | | | |
|---|---|---|---|
| 1163533 | 9/1969 | United Kingdom | 403/246 |
| 1310529 | 3/1973 | United Kingdom | 403/230 |

*Primary Examiner*—Andrew V. Kundrat
*Attorney, Agent, or Firm*—John C. Smith, Jr.

[57] ABSTRACT

A steel tube scaffold composed of tube posts and latches and on the tube posts of which brackets spaced from one another and encompassing same flange-like are secured to which the latches are connectible by means of jaws secured endwise at the latches and with which the latches are interlockable by wedges. The circumference of each bracket has a tapered surface extending throughout the perimeter of the circumference. The jaw is firmly inserted into the latch by means of a shank having an aperture therein. In the aperture of the shank of the jaw there is provided an inclined surface for the wedge which in the driven-in condition is supported with one of its sides on the tapered surface of the circumference of the bracket and with the other of its sides on the inclined surface.

3 Claims, 2 Drawing Figures

3
3
4
7
8
6
1
2
3
3
9
10

STEEL TUBE SCAFFOLD

BACKGROUND OF THE INVENTION

This invention relates to a steel tube scaffold with tube posts on which there are secured spaced brackets encompassing said posts flange-like, at which brackets the tubular braces or latches of the scaffold are attachable by means of jaws secured endwise of the latches and by means of which the latches are interlockable by wedges, the wedges being drivable into apertures of the jaws.

Such a steel tube scaffold is known from German Offenlegungsschrift No. 24 49 124. Therein, the brackets consist of annular discs with apertures onto which the latches are capable of being pushed with their jaws. The cheeks of the jaws have apertures corresponding to one another for receiving a wedge which upon being driven in passes through an aperture of the disc and the jaw. The jaws are clamped when driving in the wedge with the free ends of their cheeks to the periphery of the tube post in order to insure a positive mechanical and frictional connection of the latches to the tube post. Therein, however, the possibility cannot be precluded that the periphery of the tube post will become so seriously deformed inwardly at the points of contact with the jaws after a relatively short period of time already that not only no clearance-free wedging is possible any more, but also the tube posts as a result of the weakening caused by the inward deformation must be prematurely exchanged.

SUMMARY OF THE INVENTION

It is the object of the present invention to provide a wedge connection by which a deformation and thus weakening of the tube posts is avoided.

According to the invention, it is provided for that the periphery of each bracket has a tapered surface extending around the circumference of the periphery and in the aperture of the shank of the jaw there is arranged an inclined surface for the wedge which in the driven-in condition is supported with its one side on the tapered surface of the periphery of the bracket and with its opposite side on the inclined surface.

By the positive mechanical and frictional wedge connection of a latch with the brackets of two tube posts, according to the invention, the deformation of the tube posts resulting by the wedge connection is avoided.

An advantageous development of the steel tube scaffold according to the invention is one wherein each bracket is provided with a circular collar surrounding the tube post at a distance, which collar is trapezoidally converging upwardly in cross section, and wherein the cheeks of the jaws inwardly are formed accordingly trapeziodally and corresponding to the curvature of the collar.

The braces or latches are firmly pushed vertically onto the collars of the brackets with their jaws. Thereby in an advantageous manner a further, namely direct positive mechanical connection of the latches to the brackets and thus an increased stability of the scaffold is achieved. The configuration of the brackets according to the invention is also an advance in the following aspect: When securing the prior art brackets to the tube posts, it must be observed that the apertures of the individual brackets exactly are in alignment with one another, since otherwise the connection of two tube posts is doubtful. This requirement is eliminated with the brackets according to the invention, thereby the connection of the brackets to the tube posts being substantially facilitated. The bracket according to the invention furthermore offers the advantage that the latch may be attached at any desired angle.

BRIEF DESCRIPTION OF THE DRAWINGS

An embodiment of the invention will now be described by way of example and with reference to the accompanying drawings, in which.

DESCRIPTION OF THE PREFERRED EMBODIMENT

Figure 1:
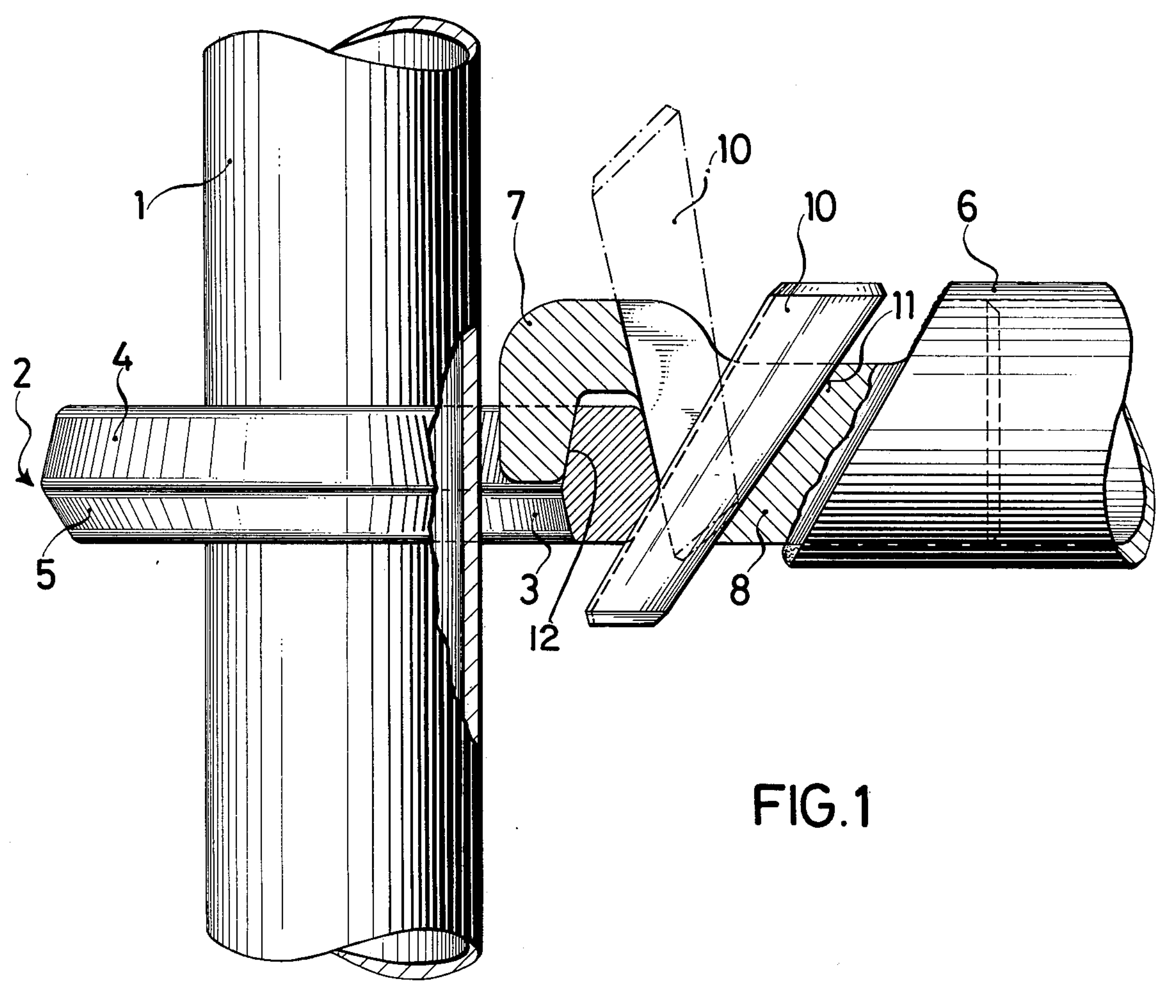
FIG. 1 is a fragmentary side elevational view, partially in section, of a tube post of a steel tube scaffold and a horizontal brace or latch connected to the tube post.
Figure 2:
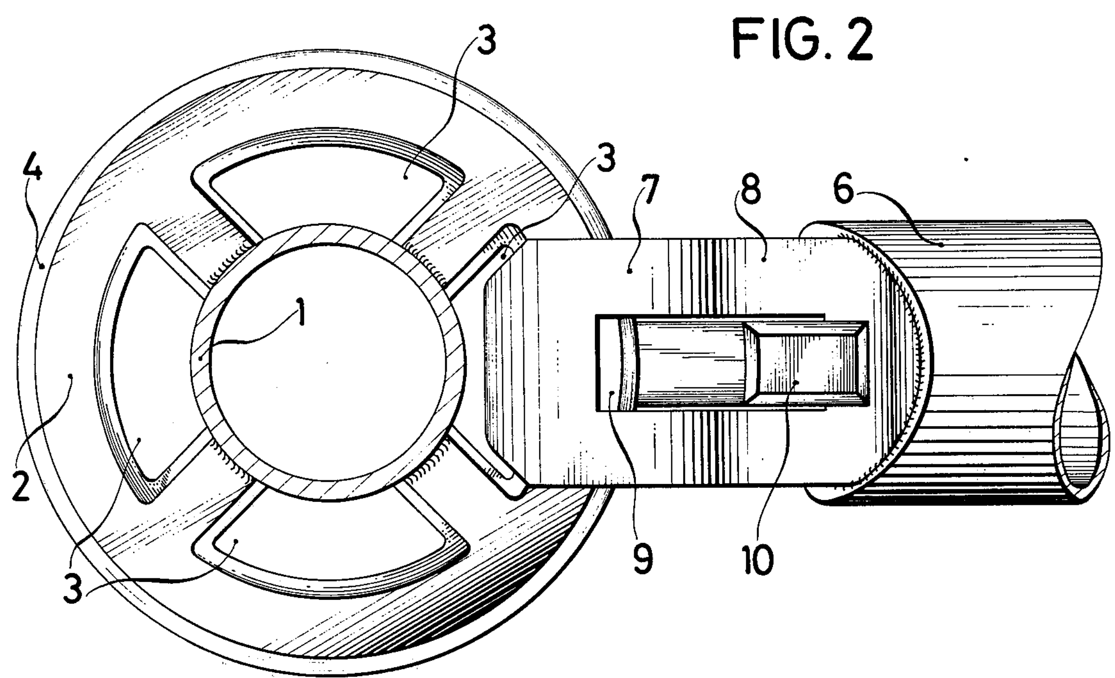
FIG. 2 is a plan view thereof.

The drawings show a tube post 1 of a steel tube scaffold on which post there is secured by welding an annular bracket 2. The annular bracket 2 possesses circularly arranged apertures 3 serving as passages for rain water, dirt or the like and a collar 4 encompassing the tube post 1 at a distance, said collar being integral with the bracket 2. The collar 4 is trapezoidally converging in cross section upwardly and includes a surface 12 facing the tube post 1 and at an acute angle with respect to the axis of the tube post 1. The periphery of the annular bracket 2 has a tapered surface 5 opposite the tube post 1 which extends throughout the circumference of the periphery, the surface 5 being at an acute angle with respect to the axis of the tube post 1 greater than the acute angle of the surface 12. The reference numeral 6 designates a horizontal tubular brace or latch which carries a hook-like jaw 7 at its ends. The jaw 7 is firmly inserted into the latch 6 by means of a shank 8. The cheeks of the jaw 7 are inwardly formed according to the curvature and the trapezoidal taper of the collar 4 of the annular bracket 2. The latch 6 is firmly pushed vertically onto the collar 4 of the bracket 2 with the jaw 7. The shank 8 of the jaw 7 has an inclined aperture 9 which serves to receive an elongate wedge 10. The wedge 10 in its effective position is supported on the tapered surface 5 of the periphery of the bracket 2 on the one hand and on the inclined surface 11 of the aperture 9 of the jaw 7 on the other hand, the surface 11 being at an acute angle with respect to the axis of the tube post greater than the acute angles of the surfaces 12 and 5. The wedge 10 is conveniently connected non-losably to the jaw 7.

The invention may be embodied in other specific forms without departing from the spirit or the essential characteristics thereof. The embodiment is therefore to be considered in all respects as illustrative and not restrictive.

What is claimed is:

1. Tubular metal scaffolding comprising:

(a) a plurality of substantially vertical tubular posts, each having at least one bracket thereon, and a plurality of substantially horizontal tubular braces, each having at least one hook-like jaw for engaging a bracket on a tubular post;

(b) each said bracket on said tubular posts comprising a member extending in a direction transverse to the longitudinal axis of and being spaced from its tubular post, at least a portion of the surface of said member facing said tubular post and at least a portion of the surface of said member opposite said tubular post each being at different acute angles with respect to said axis of said post, (c) each said hook-like jaw on said tubular braces for engaging a bracket of a post being adapted to be secured to said bracket with the interior surface of said jaw contacting said member including said portion of said surface facing said post, said jaw having an aperture passing therethrough in a direction transverse to and in communication with said member, the interior surface of said aperture facing said member being at an acute angle that is different from said first mentioned angles with respect to said axis of said post;

(d) said scaffolding further comprising an elongated wedge adapted to be inserted in said aperture in said jaw after said jaw is placed in engagement with said member of said bracket such that the opposite surfaces of said wedge simultaneously engage said surface of said aperture facing said member and said portion of said surface of said bracket member opposite said post to lock together and prevent separation of said bracket and said jaw.

2. Tubular metal scaffolding as set forth in claim 1 wherein said portion of said surface of each said member facing said tubular post is at a first acute angle with respect to said axis of said post, said portion of said surface of each said member opposite said tubular post is at a second acute angle with respect to said axis of said post greater than said first acute angle and said surface of said aperture facing said member in said jam is at a third acute angle with respect to said axis of said post greater than said first and second acute angles.

3. Tubular metal scaffolding as set forth in claim 1 wherein each said bracket is an annular bracket encompassing said tubular post and said member is annular in configuration and spaced from said tubular post, and the interior surface of said jaw conforms with the part of the surface of said annular member with which it comes in contact.

* * * * *